(No Model.) 2 Sheets—Sheet 2.

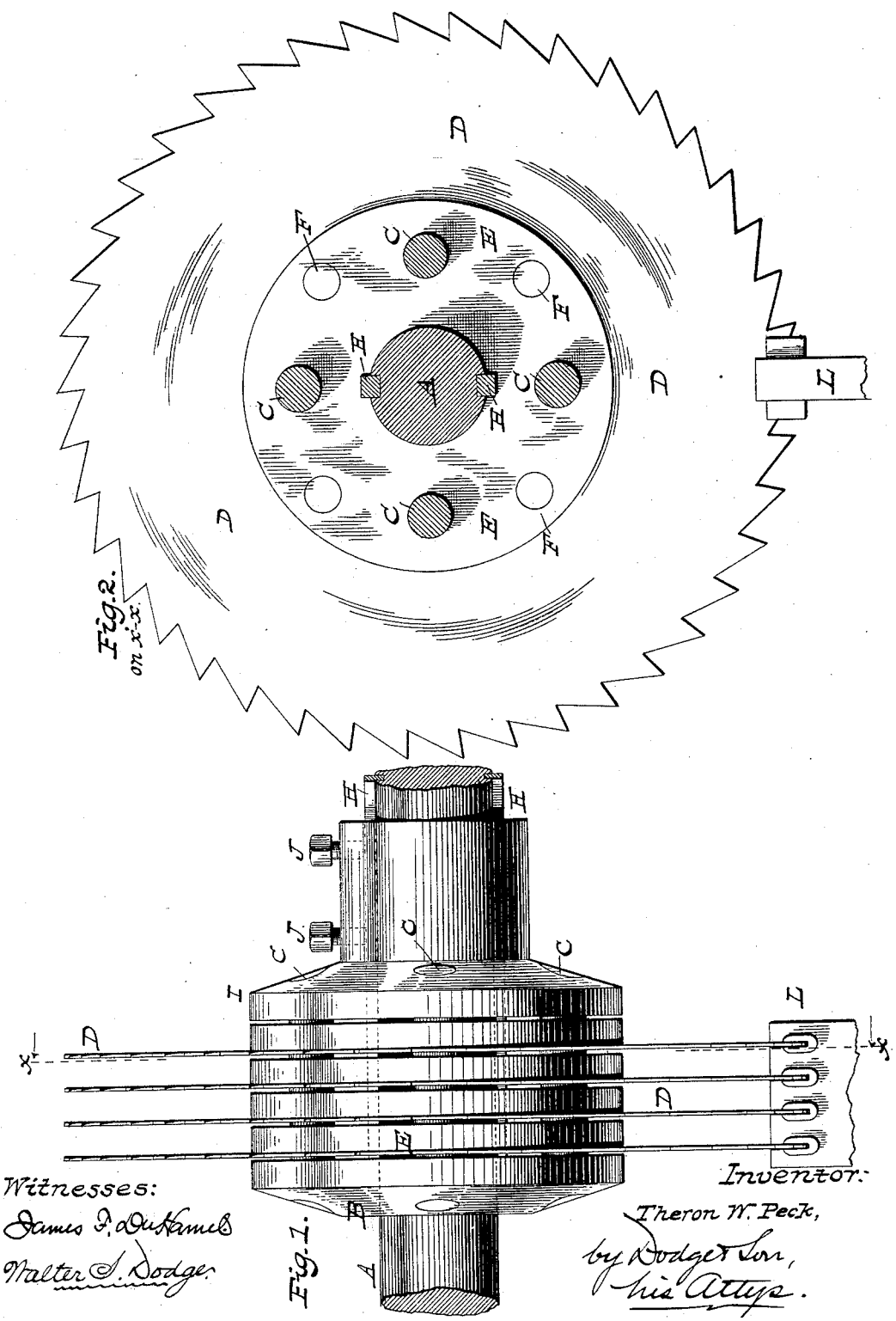

T. W. PECK.
SAW HANGING.

No. 336,661. Patented Feb. 23, 1886.

Witnesses:
James F. Duhamel
Walter S. Dodge

Inventor:
Theron W. Peck,
by Dodge & Son,
his Attys.

UNITED STATES PATENT OFFICE.

THERON W. PECK, OF MILWAUKEE, WISCONSIN, ASSIGNOR TO EDW. P. ALLIS & CO., OF SAME PLACE.

SAW-HANGING.

SPECIFICATION forming part of Letters Patent No. 336,661, dated February 23, 1886.

Application filed December 16, 1885. Serial No. 185,824. (No model.)

*To all whom it may concern:*

Be it known that I, THERON W. PECK, of Milwaukee, in the county of Milwaukee and State of Wisconsin, have invented certain new and useful Improvements in Devices for Hanging Saws, of which the following is a specification.

My invention relates to mounting saws upon their arbors; and it consists, principally, in arranging the saws and their collars so that each may have a limited play longitudinally upon the arbor when, during the cut, the saw runs off a straight line.

The invention also consists in other features and details of construction hereinafter referred to.

Figure 3:
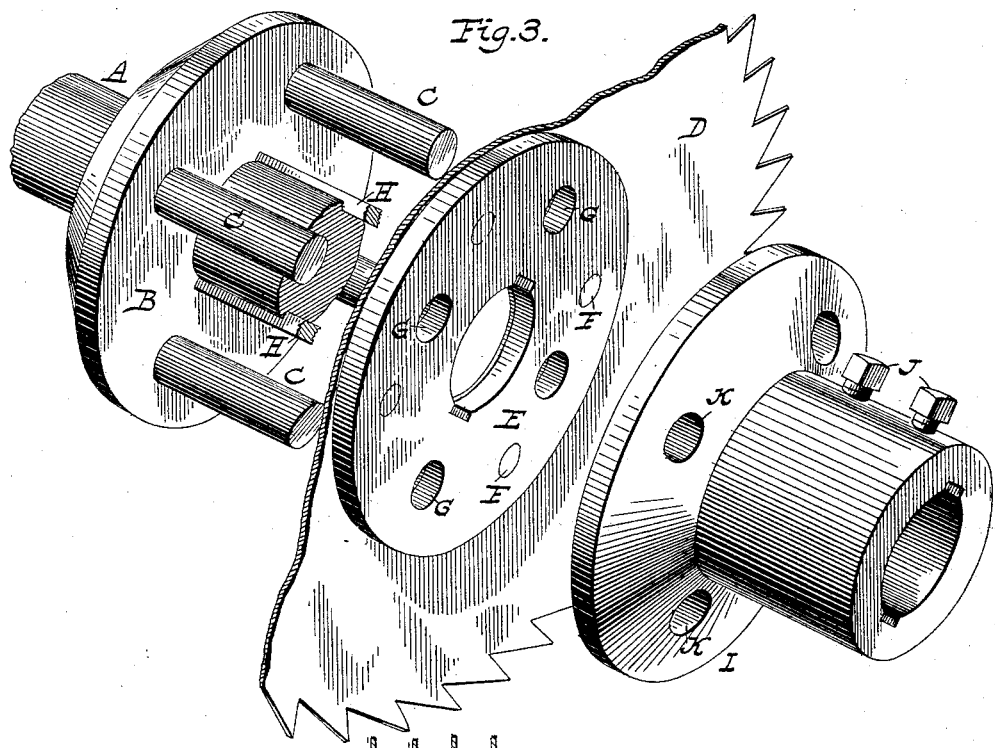
Figure 4:
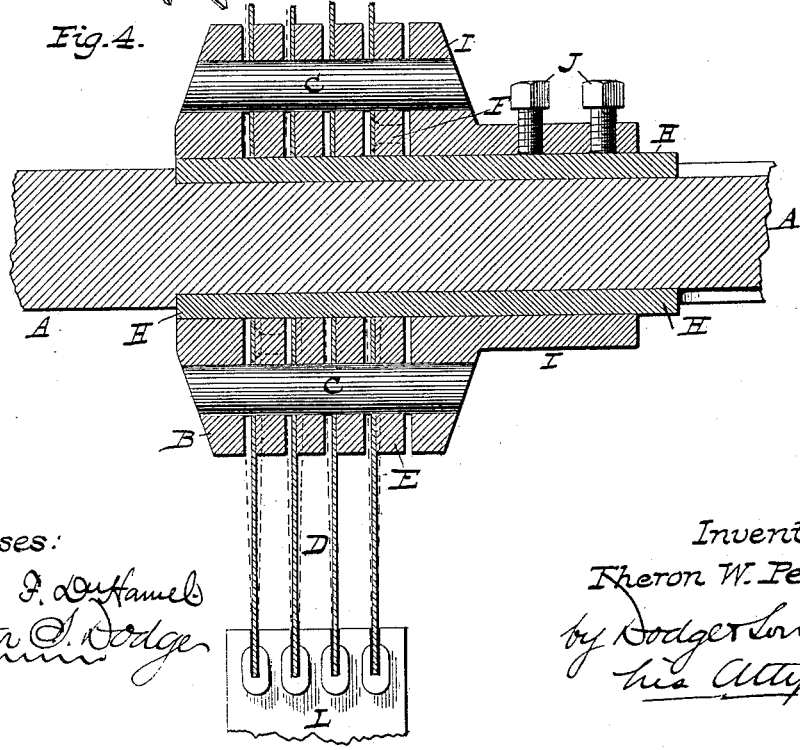

In the drawings, Figure 1 is an edge view of a gang of saws mounted upon their arbor in accordance with my invention; Fig. 2, a section of the same on the line *x x*; Figs. 3 and 4, detail views.

Heretofore in gang-edgers and similar gang-saw machines difficulty has been experienced by reason of the lumber wedging between the saws, which latter, together with their collars, have occupied fixed positions in sawing. To obviate this, I allow the central portion of the saws, with their collars, a limited movement longitudinally upon the arbor, while their peripheries occupy fixed positions. This will be better understood upon referring to the drawings, in which A represents a saw-arbor, and B a fixed or stationary collar secured thereto. This collar is provided on its vertical face with a series of pins, C, (seen clearly in Figs. 2 and 3,) which pins are arranged concentrically about the arbor and extend parallel therewith the distance required for the number of saws employed. The pins C may be screwed or riveted in the collar B, or secured thereto in any suitable manner, and it will also be seen that they may be angular or circular in cross-section.

D indicates the saws, which may be of any desired pattern, each of which is provided with a collar, E, concentric with its eye, the collars being secured to the saws by means of screws F, or in any equivalent manner. The saws and the collars are provided with holes or perforations G, which conform in cross-section to the form of the pins C, and the eye is of a size to accurately fit the arbor A. Each saw D, with its collar E, is slid upon the end of the arbor and onto the pins C of the fixed collar B, thus preventing the saws from rotating independently of the arbor.

In order to assist in preventing independent rotation of the saws and arbor, the latter is advisably provided with a longitudinal key, H, one or more, as shown in Fig. 2, upon which the saws move longitudinally.

In the drawings I have shown four saws mounted upon the arbor; but I do not wish to be understood as limiting myself to that number, as it is apparent that a greater or less number may be used. After the saws are in place I slide upon the end of the arbor A a collar, I, similar to collar B, but provided with a hub, and with set-screws J J, as clearly shown in Fig. 1. This collar I is grooved for the reception of the key H, and is also provided with sockets or perforations K, to receive the ends of the pins C. When in position, the collar is securely clamped by means of the screws J, which may bear directly upon the arbor or upon the key, as preferred. When thus constructed, it will be seen that there is a space between each saw D and the collar E of the adjacent saw equal to about the thickness of the saw. There is also a space between the collar B and the collar of the first saw, and the collar I and the face of the last saw, equal to the thickness of the saw, more or less. The combined thickness of the saws and collars is less than that of the lumber to be sawed, which allows the space between the saws, as above referred to, the saws being held the proper distance apart by the saw-guides L. (Seen in Fig. 1.)

Now, should any saw run off from a straight line, it will be seen that as its periphery is prevented by its guide from moving laterally its center can move upon the arbor in either direction, as indicated in dotted lines in Fig. 4, and assume the normal position again. It will thus be seen that the saws can adjust themselves to the lumber, and that no wedging action whatever will occur.

The pins C support the saws and prevent them from wabbling. The centrifugal force due to the rapid rotation of the saws of course causes them to travel in planes perpendicular to the axis of the arbor, and therefore when caused to shift in either direction they will assume and maintain such position, consequently sawing smoothly and evenly and producing only a narrow slit. By this plan the saws are caused to automatically adjust and adapt themselves to the varying thickness or character of the lumber, and the lumber is prevented from wedging or binding between and springing or burning the saws.

I am aware that it has been proposed to move saws longitudinally upon their arbors by means of guides clasping the edges of the saws, and this I do not claim.

Having thus described my invention, what I claim is—

1. In combination with a saw-arbor, a collar secured thereupon, pins projecting from said collar parallel with the arbor, a saw, a collar mounted upon the latter, provided with holes to receive the arbor and pins, and a second collar separate from the saw, also mounted upon the arbor, to receive the ends of the pins, and provided with a set-screw.

2. In combination with a saw-arbor, a collar secured thereon, pins projecting from said collar parallel with the arbor, a saw, a collar secured to the latter, provided with holes to receive the arbor and pins, and a second collar, also mounted upon the arbor, to receive the ends of the pins, and provided with a set-screw, the collars upon the arbor being separated a distance greater than the thickness of the saw and its collar.

3. In combination with a saw-arbor, a collar secured rigidly thereupon and provided with pins extending parallel with the arbor, a gang of circular saws mounted loosely on the arbor and pins, a second collar secured to the arbor and separated from the first collar a distance greater than the thickness of the saws, and adapted to receive the ends of the pins, and saw-guides clasping the edges of the saws, substantially as shown and described, whereby the saws, while held rigidly at the periphery, are permitted to vibrate longitudinally upon their arbor between the collars.

4. In combination with arbor A, collars B I, secured thereon, pins C, extending from collar to collar parallel with the arbor, saws D, mounted loosely upon the arbor and pins, a collar, E, around the eye of each saw, a key or spline, H, extending longitudinally of the arbor, and a guide, L, clasping the periphery of the saws, all arranged and operating substantially as shown and described.

THERON W. PECK.

Witnesses:
J. H. BERKSHIRE,
G. M. HINKLEY.